United States Patent Office 3,416,996
Patented Dec. 17, 1968

3,416,996
FUEL HANDLING SYSTEMS ASSOCIATED WITH A NUCLEAR REACTOR
John Cornelius Burton and Frank Charles Long, Whetstone, and Desmond John Walker, Poole, England, assignors to The English Electric Company Limited, London, England, a British company
Filed Apr. 3, 1967, Ser. No. 627,711
Claims priority, application Great Britain, Apr. 1, 1966, 14,466/66
6 Claims. (Cl. 176—30)

ABSTRACT OF THE DISCLOSURE

In a combined dry-store and fuel-handling facility for a nuclear reactor, a carousel is rotatable on a vertical axis so that its tubes can communicate variously with (1) a fueling machine above the facility, (2) means below the carousel for cutting up used fuel-stringer tie-rods for disposal to a closed void, (3) a space below the carousel containing means for removing spent fuel elements and means for loading new fuel elements and/or tie-rods into the carousel, and (4) handling means above the carousel for moving fuel element components about as appropriate with the facility, which is isolated from the outside atmosphere and has its own common protective atmosphere.

---

This invention relates to fuel handling systems associated with a nuclear reactor employing nuclear fuel arranged in fuel stringer assemblies.

Fuel-element handling systems for nuclear reactors usually have to fulfil the following principal functions:

(1) Loading the fuel elements into the reactor and removing them therefrom in an irradiated condition when their useful life is exhausted;

(2) Storing the irradiated elements after removal from the reactor, until they reach an acceptably low radiation level;

(3) Disposing of the elements after such storage; and (4) Transporting the elements from place to place in or in the vicinity of the reactor.

In addition, it may be necessary to shuffle the fuel elements, i.e. rearrange the order in which they are stacked in the reactor, at intervals during their active life in the reactor.

The fuel elements are arranged in the form of stringers, i.e. the elements are joined together either by a central tie-rod or by other means. In a typical example a number of stacked fuel elements are supported on the lower end of a tie-rod or the like which extends coaxially up through the elements, the top of the tie-rod or the like being fixed by suitable means (usually some kind of releasable load-bearing joint arrangement) to the bottom of a stringer plug. The latter is removably located in a standpipe which extends up to the top surface of the pile cap of the reactor (i.e. the top surface of the pressure vessel/biological shield), and by engaging the top of the stringer plug a handling device can therefore move the whole fuel stringer assembly, i.e. the fuel stringer and stringer plug. Before being loaded into the reactor, the fuel elements must be assembled together to form a fuel stringer assembly by insertion of the tie-rod or the like and attachment of a stringer plug.

Similarly, if shuffling takes place the stringer must be dismantled before shuffling and reassembled afterwards. Finally the stringer must be dismantled either before the irradiated elements are stored or afterwards, before final disposal.

Associated with a typical reactor there may be one apparatus for shuffling and a further apparatus comprising a store for irradiated fuel elements. The latter may be a cooling pond or a dry store, the fuel elements being cooled by water or by gas flow, respectively. Such an arrangement necessitates transporting the various fuel stringer components from one said apparatus to another, and between each apparatus and the reactor. This will normally be done by the same reactor fueling machine which loads the fuel into the reactor and unloads it therefrom.

Fuel-element disposal means, associated with the irradiated fuel element store, must also be provided.

Such arrangements occupy a great deal of space compared with that occupied by the reactor itself, and transporting irradiated fuel and other components on the pile cap, especially before they have been stored to allow their radiation to diminish, presents obvious hazards. There is for example a possibility of the fuel being dropped accidentally in the open atmosphere.

In this specification, the word "carousel" means a rotatable rigid assembly comprising a plurality of tubes for storage of fuel elements and other objects, arranged parallel to each other and on a common pitch circle.

According to this invention, a fuel handling system includes a rotatable gas-cooled carousel having a plurality of vertical carousel tubes, loading means below the level of the carousel for taking components away from the vicinity of the reactor and for bringing them there, access duct means for giving access between appropriate carousel tubes and a reactor fueling machine and between appropriate carousel tubes and said loading means, handling means including a grabhead for transferring components between the carousel tubes and said loading means and between one carousel tube and another, and dismantling means for dismantling a fuel stringer supported in the carousel, said loading means, handling means and dismantling means all being interconnected so as to be able to communicate with the carousel directly and in isolation from the ambient temperature, and said handling means and loading means being arranged in line with each other and with the carousel between them, so that both may operate simultaneously on an appropriately-positioned carousel tube.

According to a preferred feature of the invention, where each fuel stringer assembly comprises a stringer plug together with a fuel stringer which includes a downwardly-extending tie-rod releasably attached to said plug and a plurality of stacked fuel elements supported on support means at the lower end of the tie-rod, said dismantling means comprise tie-rod releasing means at a fixed level adjacent the top of the carousel for releasing a said tie-rod from the associated stringer plug of a fuel stringer assembly in an appropriately-positioned carousel tube, and for attaching it thereto, and tie-rod removing means below the carousel for removing downwardly a tie-rod so released, the tie-rod removing means and releasing means being vertically in line with each other so that they can both operate successively without intermediate movement of the carousel.

Preferably, said tie-rod removing means comprises cutting means spaced vertically above valve means and is adapted to operate in a sequence of operation wherein a tie-rod released by said releasing means drops onto said valve means, the valve means being closed, the cutting means cuts the tie-rod and supports the uncut portion of the tie-rod, the valve means is opened to dispose of the cut portion of the tie-rod and is then closed again, and the cutting means is released to allow said uncut portion to drop onto said valve means.

According to another preferred feature of the invention, said loading means includes a tie-rod loading tube arranged for alignment with a duct of said access duct means giving access between an appropriate carousel tube and said loading means, means for inserting a tie-rod into said carousel tube from said loading tube through said duct so that a fuel stringer can be assembled therein by operation of said handling means to place in the carousel tube the remaining components of the stringer, and means for supporting the completed stringer in said carousel tube until a stringer plug is attached to the top of the tie-rod.

According to a further preferred feature of the invention, there is a gas-cooled magazine having a plurality of vertical magazine tubes disposed on a common pitch circle, such that the pitch circles of the magazine and carousel tubes have at least one common vertical tangential plane, the magazine being arranged between said handling means and the carousel and rotatable independently of the carousel, each magazine tube being open at the end thereof remote from the carousel, at least one magazine tube being open at both ends, and the length of each magazine tube being at least equal to that of a fuel element.

The magazine may be coaxial with the carousel, the magazine tubes and carousel tubes lying on the same pitch circle.

There may be a plurality of said carousels rotatable about separate axes spaced apart horizontally and associated with a common said loading means; or alternatively a number of carousels on a common axis, separately rotatable and each associated with a separate loading means.

The methods of assembling and dismantling fuel element stringer assemblies in a fuel handling system according to the invention are included in the scope of the invention.

One fuel-element handling system for a nuclear reactor, in a preferred form according to the invention, will now be described by way of example and with reference to the accompanying drawings, of which:

In FIG. 2 a magazine shown at 18 in FIG. 1 is shown as having been rotated so that magazine tubes 19 and 70, shown in FIG. 1, have changed places.

Figure 1:
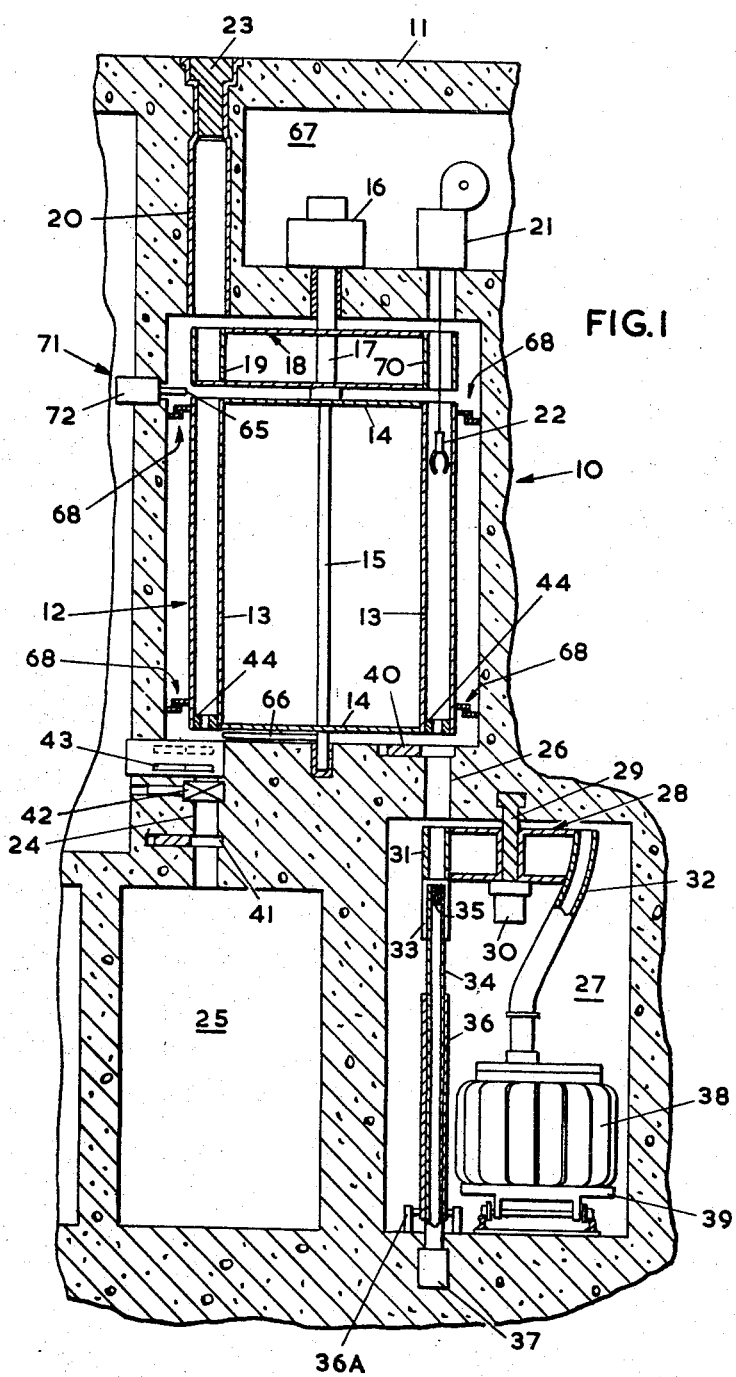
FIG. 1 is a diagrammatic sectional elevation showing the handling system.

With reference firstly to FIG. 1, the handling system is completely enclosed within a concrete structure 10 incorporating the pile cap 11 of the reactor and arranged adjacent the reactor itself which is not shown but which may be taken as being to the left of the apparatus shown in FIG. 1. The system comprises a rotatable carousel 12 comprising a number of vertical open-ended tubes 13 (only two of which are shown, for clarity), fixed circumferentially on a common pitch circle around a frame 14 which is mounted on a central vertical shaft 15. The shaft 15 is rotatable by a main drive unit 16. A magazine 18 is fixed to a hollow shaft 17 which is coaxial with the shaft 15 and which is rotatable by the same drive unit 16 independently of the shaft 15. The magazine 18 comprises a number of vertical parallel magazine tubes 19, open at their top ends, and a through-tube 70, all mounted on a fram fixed to the shaft 17 and arranged on the same pitch circle as the carousel tubes 13. Each tube 19, 70 is long enough to hold one fuel element.

Two ring seals 68 are provided between the concrete structure 10 and the top and bottom, respectively, of the carousel 12.

In any rotational position of the carousel 12 or magazine 18, two magazine tubes 19 (or 19 and 70) are in communication with a standpipe 20 and a winding unit 21 respectively, located directly above diametrically-opposite tubes of the magazine 18 and carousel 12. The winding unit 21 is arranged for winding a grabhead 22. The winding unit and grabhead 22 together constitute a handling means for components of fuel element stringers. The standpipe 20 has an open end penetrating the pile cap 11 and is normally closed by a removable standpipe plug 23.

Vertically below the standpipe 20, and below the carousel 12, is a tie-rod disposal duct 24 leading to an enclosed void 25; while vertically below the winding unit 21, and again below the carousel 12, is a short duct 26 communicating with a service space 27 which can be isolated from the ambient atmosphere by suitable sealed doors (not shown). The space 27 contains loading means for bringing components to the vicinity of the reactor and for taking them away. The loading means include a turret 28, a flask 38 and a tie-rod loading tube 34. The turret 28 includes a vertical open-ended tube 31 and a discharge tube 32; the top ends of tubes 31 and 32 are arranged at such a radius from axis 29 as to be able, on appropriate rotation of the turret 28, to communicate with the duct 26. The turret 28 also carries a gag-inserting device (not shown), to which reference will be made later.

Projecting downwardly below the tube 31 is a guide 33 with which the tie-rod loading tube 34 engages, coaxially with the tube 31, when the tube 34 is in the vertical position shown. The tie-rod loading tube 34 incorporates a bung 35 at its upper end, and is slidable axially, in both the turret tube 31 and duct 26. The loading tube 34 is slidably supported in a coaxial tube 36 which is pivoted on a pedestal 36A fixed to the floor of the service space 27, so that the tube 36, carrying the loading tube 34, can be swung to a substantially horizontal position.

In the floor of the service space 27, below the tie-rod loading tube 34 when the latter is in its vertical position, is a jacking unit 37, of any suitable known design, which can raise the loading tube 34 by a limited amount and which is also arranged to lift a tie-rod (not shown) from the loading tube 34 into the corresponding carousel tube 13.

The discharge tube 32 is so shaped that it can be connected for loading the fuel element transport flask 38, which is brought into the service space 27, either on a trolley 39 or by other suitable means.

Gate valves 40 and 41 are arranged respectively at the top of the duct 26 and near the bottom of duct 24, while in the duct 24, spaced from and above the valve 41, there is a combined gate valve and cutter unit 42.

Above the unit 42 is a gripping device 43, movable vertically for operation in either a lower position or an upper position. These positions are shown by full and broken lines respectively.

Suitable means (not shown) are provided for circulating a gas through the carousel 12 and magazine 18: this circulating means may comprise the circulating blowers which also circulate coolant gas through the reactor core, suitable ducting being provided to divert some of this gas through the magazine 18 and carousel 12, or through a separate cooling circuit (not shown) for the dry store.

In normal use the lower end of each carousel tube 13 is furnished with a removable gag 44.

It will be understood that the various components are all shown in FIG. 1 very diagrammatically, for simplicity.

The gags 44 are engaged in the tubes 13 by suitable releasable locking devices (not shown), of any well-known kind for example incorporating ball locking means for securing them in the tubes.

The gripping device 43 may comprise, for example, a pair of hydraulically-operated jaws. Instead of the single gripping device 43, movable vertically between two operational positions, two separate fixed gripping devices may be provided.

The unit 42 may for example comprise a pair of hydraulically-operated shears, so arranged that in their closed position they close the duct 24 so as to serve as a valve.

The jacking unit 37 may be of any convenient kind. The means for raising a tie-rod may comprise, for example, a free piston in the loading tube 34, supporting the tie-rod and movable up the loading tube 34 under pressure of a fluid applied from the jacking unit 37. Any other suitable means may however be used for raising a tie-rod into the carousel.

Figure 2:
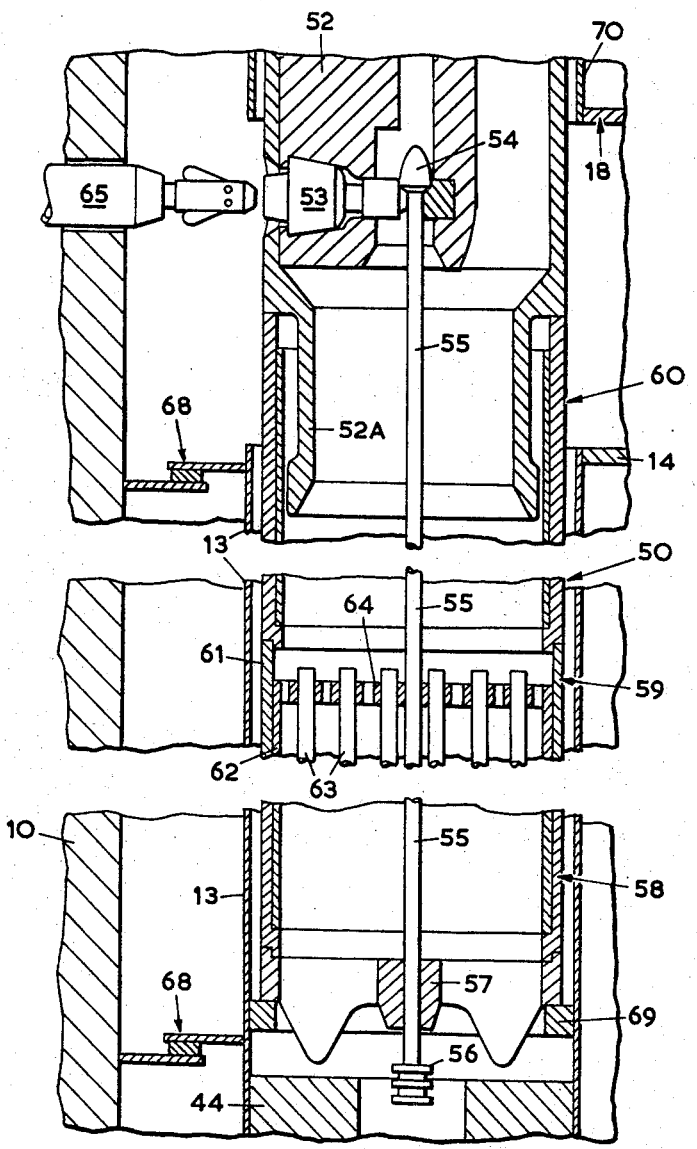
FIG. 2 is an enlarged sectional elevation of part of the same handling system, showing a fuel element stringer at one stage during loading of the system.

FIG. 2 shows, on an enlarged scale, portions of the magazine through-tube 70 and of a carousel tube 13 vertically in line with the standpipe 20 shown in FIG. 1. Relevant parts of a fuel stringer assembly 50 are shown in a position in which the stringer assembly has been lowered by a fuelling machine (not shown) positioned over standpipe 20 with plug 23 removed, until the stringer assembly rests on a support ring 69 fixed in the bottom of the carousel tube 13 just above the gag 44.

The fuel stringer assembly includes a stringer plug shown diagrammatically at 52 and incorporating a tie-rod clamping device 53 which supports the conical upper end 54 of a tie-rod 55. The bottom end of the tie-rod 55 has a knob 56, the tie-rod 55 passing through a coaxial spider 57. The spider 57 rests on the support ring 69. Stacked on top of the spider 57, there are (in order reading upwards), a bottom reflector sleeve 58, a number of fuel elements 59 and a top reflector sleeve 60. Each fuel element 59 comprises an outer graphite reflector sleeve 61, an inner graphite reflector sleeve 62 fitting snugly in the sleeve 61, and a number of longitudinally-extending fuel pins 63 which are arranged between spacers 64 (only one of which is shown), separated axially by the sleeve 62.

The top and bottom reflector sleeves 58 and 60 are each similar to a fuel element 59 but with the fuel pins 63 and spacers 64 omitted. The bottom reflector sleeve 58 may if desired be omitted and a fuel element substituted for it.

Into the bore of the upper reflector sleeve 60 there extends a hollow coaxial projection 52A of the stringer plug 52. The term "fuel stringer" in this specification means a fuel stringer assembly (for example the assembly 50 comprising stringer plug 52, reflector sleeve 60, fuel elements 59, bottom reflector sleeve 58 (if provided) and spider 57), but without the stringer plug 52.

The tie-rod 55, supported by the clamp 53, thus supports all the fuel elements and reflector sleeves in the fuel stringer and holds them together when the stringer assembly is being raised, since the spider 57 then rests on the knob 56.

In the position shown, the clamp 53 lies horizontally opposite a releasing device 71 comprising a hydraulic unit 72 (FIG. 1) operating a plunger 65 to release clamp 53.

In operation, storage systems such as that described may be used for at least the following functions:

1. Storage of irradiated fuel elements and reflector sleeves after removal of the latter from the reactor, with eventual transfer of the fuel elements and reflector sleeves to the transport flask or other means for removal of the elements and sleeves from the vicinity of the reactor.

2. Shuffling (i.e. rearrangement of the order of stacking) of fuel elements and reflector sleeves in a fuel stringer during the period of their active use in the reactor.

3. Introducing new fuel elements and sleeves from a transport flask or the like to the reactor fueling machine.

Each of these functions will now be described in turn.

(1) Storage of irradiated fuel elements, etc.

This comprises the following stages:

(a) Introduction of an irradiated fuel stringer assembly to the carousel.

(b) Removal and disposal of the tie-rod.

(c) Removal of the stringer plug.

(d) Storage of the remaining fuel stringer components for a predetermined time.

(e) Loading the transport flask with fuel stringer components for disposal.

The stringer plug 52 and its fuel elements and reflector sleeves 58 are withdrawn from the reactor by the fuelling machine, which then travels to a position over the standpipe 20. Coolant gas is forced continuously through the fuelling machine and the standpipe 20.

An empty carousel tube 13 is positioned over the duct 26, and the turret 28 is rotated so that the gag-inserting device thereon can place a suitable gag 44 in the bottom of the tube 13. The carousel 12 and magazine 18 are now rotated so that the said empty carousel tube 13 and the through-tube 70 in the magazine are located in line with each other below standpipe 20 as in FIG. 2.

The standpipe plug 23 is now removed and stored in the fuelling machine, which then lowers the fuel stringer assembly 50 down through the tube 70 to the position shown in FIG. 2 in the carousel tube 13. The releasing device 71 is now operated so as to unlock the clamp 53, the gripping device 43 being open and the unit 42 and gate valve 41 closed. The tie-rod 55 is now free, and it falls onto the closed unit 42.

The gripping device 43 is so arranged that if a tie-rod 55 is in the duct 42 adjacent the gripping device, automatic alternate operation (to be described shortly) of the gripping device 43, of the combined gate valve and cutting unit 42 and of the gate valve 41 can be initiated. This is achieved by a suitable control system (not shown).

The gripping device 43, in its lower position, advances horizontally to its gripping position, and, in response to its contact with the tie-rod 55, brings this control system into operation.

The gripping device 43 is released and unit 42 opened so as to allow the tie-rod 55 to fall onto the gate valve 41; the gripping device 43 grips the tie-rod, and the unit 42 then operates to cut the tie-rod; the valve 41 now opens, and the portion of the tie-rod cut off falls into the void 25. The valve 41 is then closed, whereupon the gripping device 43 is released and the unit 42 opened; and the cut end of the tie-rod 55 falls again onto valve 41. This sequence of operation is repeated until the gripping unit 43 senses that the whole of the tie-rod 55 has passed it, i.e. until it no longer contacts the tie-rod. The valve 41 is finally opened to allow the last section of the tie-rod to fall into the void 25, and the unit 42 and valve 41 are closed.

While the above operations have been in progress, the fuelling machine has removed the stringer plug 52 from the fuel stringer and replaced the standpipe plug 23 in standpipe 20. The carousel tube 13 now contains only a number of loose stacked fuel elements and reflector sleeves.

The fuel elements 59 and the reflector sleeves 58 and 60 are cooled by flow of coolant gas through the reflector sleeves and fuel elements, and they remain in the carousel until they have reached an acceptably low radiation level. They are then transferred to the flask 38, as follows.

The individual fuel elements and reflector sleeves are unloaded from their carousel tube 13 and placed in empty magazine tubes 19, using the grabhead 22 and appropriate rotation of the carousel 12 and magazine 18 to bring the various tubes 13, 19 and 70 into communication with the grabhead.

The gag 44 is now removed from an empty carousel tube 13, and the turret 28 rotated if necessary so that the discharge duct 32 lies below the duct 26. The discharge duct 32 is connected up to the transport flask 38. The carousel 12 is rotated so that the empty tube 13 without a gag 44 provides a direct passage from the magazine 18 and through the carousel 12 to the discharge tube 32. The gate valve 40 is now opened.

The magazine 18 is rotated firstly so that grabhead 22 can lift a fuel element out of a tube 19, and then again so that the through-tube 70 lies below the grabhead 22. The grabhead then lowers the element into flask 38, releases the element and is withdrawn, this cycle of operation then being repeated for the other fuel elements. When all the fuel elements have been loaded into the flask 38, the valve 40 is closed and the discharge tube 32 disconnected from the flask 38. The flask can then be taken away.

(2) Shuffling

The procedure for re-arranging the order of the fuel elements and reflector sleeves in a fuel stringer is as follows.

The fuel stringer assembly is first removed from the reactor and inserted in a carousel tube 13 by the fuelling machine; and the tie-rod 55 is removed, cut up and dropped into the void 25, and the stringer plug removed, as described above.

Using the grabhead 22 and appropriate rotation of carousel 12 and magazine 18, as described above (the through-tube 70 being used to give the grabhead access to the carousel tube 13), the elements 59 and the reflector sleeves 58 and 60 are next stored in empty magazine tubes 19.

The gag 44 is removed from an empty carousel tube 13, and the carousel is rotated so that this tube lies over the duct 26.

The tie-rod loading tube 34 is swung to its horizontal loading position and a new tie-rod 55 is inserted into it. With the turret 28 in the position shown in FIG. 1, the tie-rod loading tube 34 is swung up into engagement with the turret tube guide 33 and connected to the jacking unit 37.

The valve 40 is now opened and the jacking unit 37 lifts the loading tube 34 until the latter engages the empty carousel tube 13. The tie-rod is now lifted a small amount. The magazine 18 is rotated so that the grabhead 22 can remove the bottom reflector sleeve 58, with the spider 57 (FIG. 2), from the appropriate magazine tube or tubes 19. The magazine 18 is again rotated so that the grabhead 22 can lower the reflector sleeve and spider through the through-tube 70 and down the empty carousel tube 13, until the spider 57 rests on the bung 35 in the end of the tie-rod loading tube 34. The tie-rod is now lifted by an amount equal to the length of a fuel element, and a fuel element is now taken from its magazine tube 19 by the grabhead 22 and lowered onto the tie-rod, on top of the bottom reflector sleeve 58.

The procedure is now repeated, the fuel elements being replaced in a different order from that in which they were before, until the fuel stringer is assembled in position in the carousel tube 13. By this time the conical upper end 54 (FIG. 2) of the tie-rod is near the top of the carousel tube 13. The grabhead is lowered so as to grip the upper end 54, so that all the fuel elements and reflectors are now supported by the grabhead. The loading tube 34 is retracted and the valve 40 closed.

The turret 28 is now rotated so that the gag-inserting device (not shown) carried thereby can be inserted through duct 26 to fix a new gag in the bottom of the carousel tube 13. This gag (not shown) will be of a kind that can support the bottom knob 56 (FIG. 2) of the tie-rod, and is therefore different from the gags 44, which allow a tie-rod to pass through them. The valve 40 is re-opened and the new gag is positioned. The gag-inserting device is withdrawn, valve 40 closed, the fuel stringer released by the grabhead 22 and the grabhead withdrawn above the carousel 12.

The carousel is now rotated so that a new or reconditioned stringer plug 52 can be lowered onto the fuel stringer by the fuelling machine, and the clamping device 53 is engaged by operation of the device 72 and tool 65. The fuelling machine can now put the fuel stringer assembly back into the reactor.

(3) Introduction of new fuel elements from flask to reactor

This can be done with the turret 28 connected to the flask 38 and communicating with a carousel tube 13 (without a gag) and the through-tube 70, the valve 40 being open: the fuel elements are lifted from the flask 38 by the grabhead 22. The latter can then deposit them, together with the reflector sleeves 58 and 60, obtained from the flask 38 or from another source in the service space 27, in magazine tubes 19, the fuel stringer assembly then being completed as has been described above in connection with the shuffling process.

Alternatively, the turret 28 may be provided with a number of storage tubes like the magazine tubes 19, but arranged to be breech-loaded by hand with a new fuel element or reflector sleeve, the turret 28 then being rotated to successive positions in each of which the contents of the corresponding turret tube are removed by the grabhead 22. The procedure will then be as described above.

If during the removal of a tie-rod 55 from a fuel stringer the tie-rod should become jammed in the associated fuel elements, the gripping device 43 is clamped onto the tie-rod and is moved downwards to its lower position, dragging the tie-rod with it. If the rod is still not free, the gripping device 43 can be released and returned to its upper position to drag the tie-rod down further.

Any debris that may collect in the carousel 12 or magazine 18, or in the space around them, can be swept into the void 25 by a spiral blade 66 (FIG. 1) on the bottom of the carousel (or by some other suitable means), the gripping device 43 being retracted and the unit 42 and valve 41 open. The valves 40, 41 and other parts of the system may also be provided with means (not shown) for directing at them a blast of coolant gas or air to clear any debris.

It will be understood that many variations are possible on the arrangements so far described. Some such variations are briefly mentioned below.

All operations may be accomplished without using the magazine 18, by feeding the fuel elements one by one into different carousel tubes 13 using the grabhead 22 and appropriate rotation of the carousel 12. They are then replaced in their original carousel tube in the desired order, again using the grabhead. The procedure is then as previously described. In such a case the magazine need not be provided.

The magazine, if provided, may be mounted in the winding gear space 67 (FIG. 1) instead of where shown. The winding mechanism 21 will still be located above the magazine.

There may be any desired number of carousels 12, each on a different shaft 15, and each associated with a separate standpipe 20 and duct 24. In this case, a single magazine may be provided in the space 67, serving both or all the carousels. It is however essential that, wherever the magazine may be, the pitch circle of the magazine tubes should have a vertical tangential plane in common with the or each pitch circle of carousel tubes.

Preferably, where there are more than one carousel, they are both or all associated also with a common service space 27 and turret 28.

In place of the turret 28, an overhead crane or other suitable means in the service space 27 may be used to support and locate the tie-rod loading tube 34, the discharge tube 32 and the gag-inserting device.

The tie-rod loading tube 34 may be attached to the turret instead of being pivoted to the floor, suitable means being provided for inserting a tie-rod into the loading tube. In this case the turret 28 will preferably incorporate suitable means for raising the loading tube 34 into engagement with a carousel tube 13, and suitable means for lifting the tie-rod up inside the loading tube. Such an arrangement is especially useful if a single turret 28 serves a number of carousels, for otherwise a separate loading tube 34 would be needed for each carousel.

The various gags may be of any suitable design, and may be made removable by the gag-inserting device previously mentioned.

The gag-inserting device may be mounted in the concrete adjacent the bottom of the carousel 12, if desired, instead of on the turret 28.

The grabhead 22 may be of any suitable design and may be used in conjunction with any other suitable gripping device, for example a device adapted especially for gripping reflector sleeves 58, 60 or the like.

It will be understood that a system according to the invention enables all fuel-handling activity (apart from the actual loading and unloading of the reactor, and the journey along the pile cap associated with each reactor loading or unloading operation) to be done in a single apparatus enclosed in an atmosphere completely isolated from the ambient atmosphere. The atmosphere inside this apparatus may comprise for example reactor coolant gas (such as $CO_2$ or an inert gas).

Systems according to the invention are applicable not only to gas-cooled reactors but also to liquid-cooled reactors, water reactors and fast reactors. Some details of the system will be modified to adapt it for use with reactors other than those cooled by gas.

The various operations necessary to remove access plugs forming part of the flask, and to store them and subsequently replace them, can be carried out using the grabhead 22 or the like operated by the winding unit 21.

Fuel-element handling systems according to the invention are not confined to use with fuel elements such as those described herein, or even to use with elements arranged in stringers of the kind described, wherein the fuel elements are supported on support means (such as the knob 56) at the bottom end of the tie-rod. Other types of fuel stringer can be visualised in which there is no tie-rod, the fuel elements being locked together by suitable means or supported on the flange or similar device at the bottom end of a sleeve. Again, the knob 56 of a tie-rod may be removable, or replaced by a device having for example retractable lugs like the spring-loaded lug supporting the central axially-movable barrel of an umbrella frame; in such cases the tie-rod may be made removable and insertable from on top, so that the tie-rod loading tube may be adapted to operate through a duct above the carousel, such as the standpipe 20. It would of course have to be movable out of the way of the fuelling machine. The means for cutting up and disposing of the tie-rod, suitably modified, may then also be above the level of the carousel instead of below it.

It will be understood that the winding unit 21 may be incorporated in the fuelling machine, or it may be a separate pressurised unit which can be moved onto the top of the standpipe 20 and which would be generally similar to a fuelling machine. Then the duct 26 will be unnecessary, the turret 28 being below the standpipe 20. In this case the pieces of the tie-rod cut off by the tie-rod removing means (in this example the units 41 to 43) may either be diverted into an enclosed void through a suitable duct, or they may be dropped into a flask (such as the flask 38), or other means for transporting them away, through the tube 32.

We claim:

1. A fuel handling system associated with a nuclear reactor employing nuclear fuel arranged in fuel stringer assemblies, including a rotatable gas-cooled carousel having a plurality of vertical carousel tubes, loading means below the level of the carousel for taking components away from the vicinity of the reactor and for bringing them there, access duct means for giving access between appropriate carousel tubes and a reactor fuelling machine and between appropriate carousel tubes and said loading means, handling means including a grabhead for transferring components between the carousel tubes and said loading means and between one carousel tube and another, and dismantling means for dismantling a fuel stringer supported in the carousel, said loading means, handling means and dismantling means all being interconnected so as to be able to communicate with the carousel directly and in isolation from the ambient atmosphere, and said handling means and loading means being arranged in line with each other and with the carousel between them, so that both may operate simultaneously on an appropriately-positioned carousel tube.

2. A system according to claim 1, wherein each fuel stringer assembly comprises a stringer plug together with a fuel stringer which includes a downwardly-extending tie-rod releasably attached to said plug and a plurality of stacked fuel elements supported on support means at the lower end of the tie-rod, and wherein said dismantling means comprise tie-rod releasing means at a fixed level adjacent the top of the carousel for releasing a said tie-rod from the associated stringer plug of a fuel stringer assembly in an appropriately-positioned carousel tube, and for attaching it thereto, and tie-rod removing means below the carousel for removing downwardly a tie-rod so released, the tie-rod removing means and releasing means being vertically in line with each other so that they can both operate successively without intermediate movement of the carousel.

3. A system according to claim 2, wherein said tie-rod removing means comprises cutting means spaced vertically above valve means and is adapted to operate in a sequence of operation wherein a tie-rod released by said releasing means drops onto said valve means, the valve means being closed, the cutting means cuts the tie-rod and supports the uncut portion of the tie-rod, the valve means is opened to dispose of the cut portion of the tie-rod and is then closed again, and the cutting means is released to allow said uncut portion to drop onto said valve means.

4. A system according to claim 2, wherein said loading means includes a tie-rod loading tube arranged for alignment with a duct of said access duct means giving access between an appropriate carousel tube and said loading means, means for inserting a tie-rod into said carousel tube from said loading tube through said duct so that a fuel stringer can be assembled therein by operation of said handling means to place in the carousel tube the remaining components of the stringer, and means for supporting the completed stringer in said carousel tube until a stringer plug is attached to the top of the tie-rod.

5. A system according to claim 1, including a gas-cooled magazine having a plurality of vertical magazine tubes disposed on a common pitch circle such that the pitch circles of the magazine and carousel tubes have at least one common vertical tangential plane, the magazine being arranged between said handling means and the carousel and rotatable independently of the carousel, each magazine tube being open at the end thereof remote from the carousel, at least one magazine tube being open at both ends, and the length of each magazine tube being at least equal to that of a fuel element.

6. A system according to claim 5, wherein said magazine is coaxial with the carousel, the magazine tubes and carousel tubes lying on the same pitch circle.

References Cited

FOREIGN PATENTS

| 831,323 | 3/1960 | Great Britain. |
| 866,541 | 4/1961 | Great Britain. |

CARL D. QUARFORTH, *Primary Examiner.*

H. E. BEHREND, *Assistant Examiner.*